April 26, 1938.  R. H. BLOCKER  2,115,189
HYDRAULIC BRAKE
Filed Sept. 24, 1935  2 Sheets-Sheet 1

Inventor
ROBERT H. BLOCKER
By Howard J. Whelan
Attorney

April 26, 1938.  R. H. BLOCKER  2,115,189
HYDRAULIC BRAKE
Filed Sept. 24, 1935  2 Sheets-Sheet 2

Inventor
ROBERT H. BLOCKER.
By Howard J. Whelan.
Attorney

Patented Apr. 26, 1938

2,115,189

UNITED STATES PATENT OFFICE 2,115,189

HYDRAULIC BRAKE

Robert H. Blocker, San Francisco, Calif.

Application September 24, 1935, Serial No. 41,943

4 Claims. (Cl. 188—90)

This invention relates to hydraulic brakes and has for its primary object the provision of an improved brake construction applicable to a rotatable member, for effectively retarding its speed of rotation.

Another object of my invention is to provide an improved hydraulic brake embodying novel means capable of running free of all impedance when not in braking adjustment, but which may be readily adjusted to various positions whereby the path through which its liquid is forced may be restricted to varying degrees, thereby effectively retarding the rotation of the member to which the device is applied.

Other objects of the present invention are: To provide a hydraulic brake having a simple construction capable of affording adequate resistance to the rotatable member to which it is applied without any appreciable wear to the operating parts thereof; to provide a brake construction having cooling means embodied therein; and to provide apparatus of the kind characterized which is capable of being used with rotatable members of various kinds, including vehicle wheels and clutches.

Figure 1:
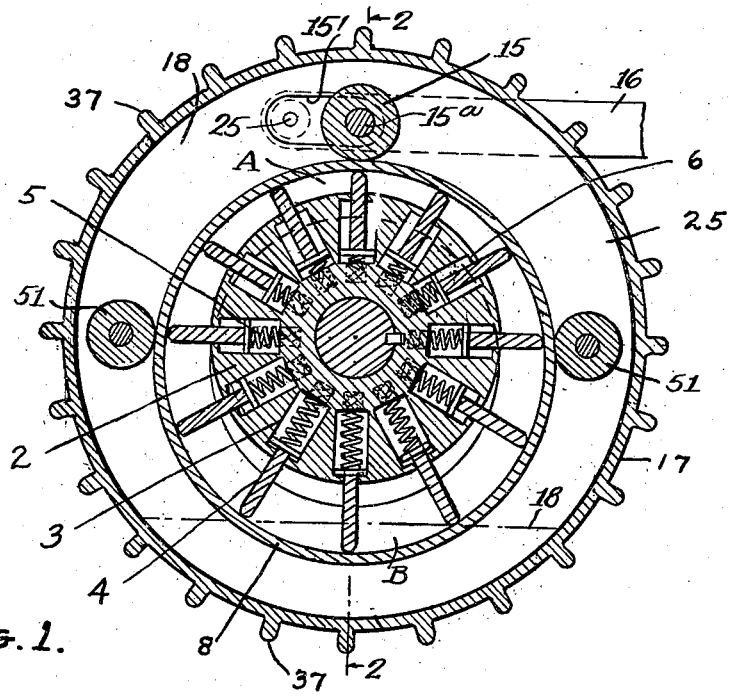
Fig. 1 is a sectional view of a hydraulic brake construction embodying my invention, showing the mechanism in partial braking adjustment.
Figure 2:
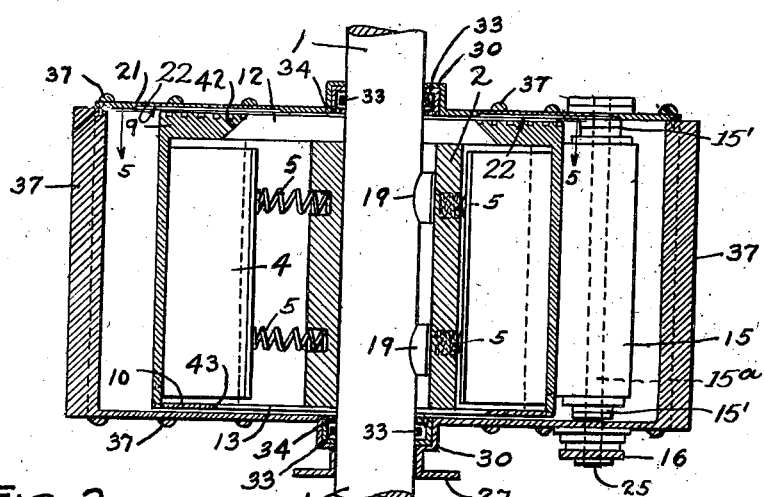
Fig. 2 is a sectional view taken on the lines 2—2 of Fig. 1.
Figure 5:
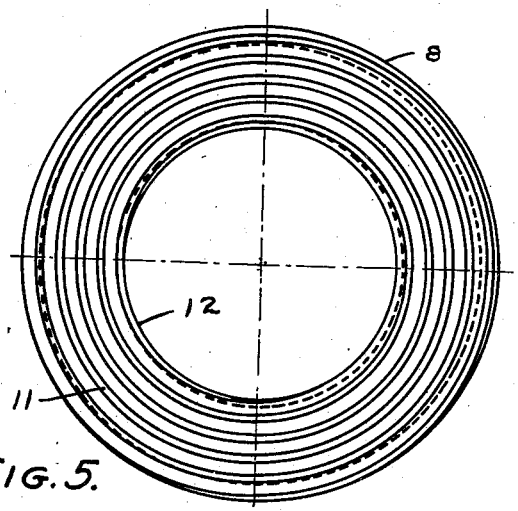
Fig. 5 is an end view of a cylindrical drum as viewed in the direction of the arrows along the line 5—5 of Fig. 2 of the cylindrical drum.
Figure 6:
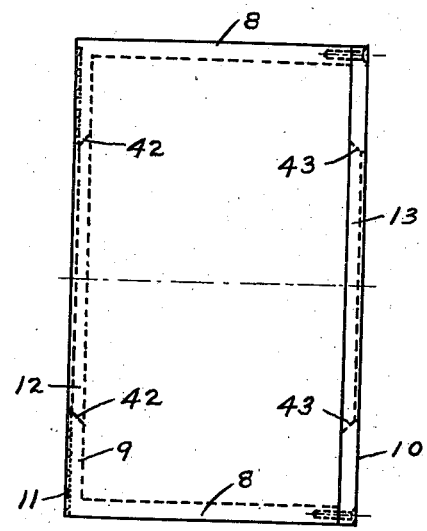
Fig. 6 is a side elevation of the cylindrical drum.
Figure 3:
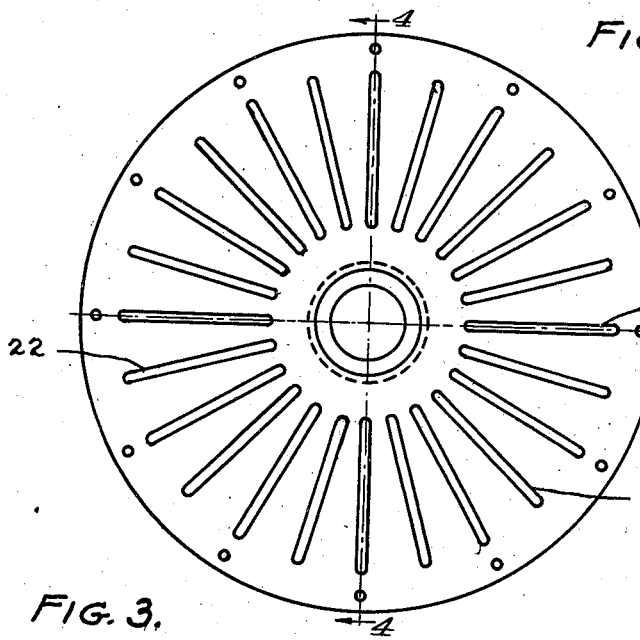
Fig. 3 is a plan view of the inside face of one of the end plates of the outer casing.
Figure 4:
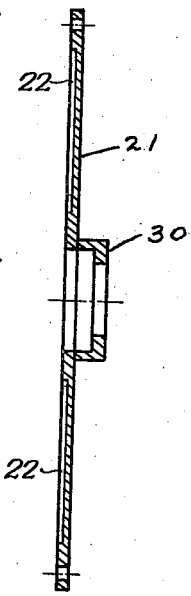
Fig. 4 is a section taken on the line 4—4 of Fig. 3.

Referring to the drawings, the numeral 1 designates a horizontal rotatable shaft having a rotor 2 keyed as at 19, thereto. The rotor is provided at its periphery with a plurality of radially disposed longitudinal slots or seats 3 within which are movably mounted a plurality of vanes or abutments 4. Each vane is mounted to slide radially, and is under tension by a spring 5 which is interposed between the inner ends of the said vane and its associated slot. The vanes 4 are substantially rectangular in shape and preferably have their outer side edges rounded. At the outer ends of the slots 3 are inwardly disposed longitudinally disposed projections 6 formed on the rotor 2 which are adapted to engage with the enlarged inner ends of the vanes 4 and thereby limit the outward movement of the said vanes. The springs 5 yieldably urge the vanes 4 outwardly into engagement with the inner circumferential surface of a cylindrical drum 8, which in the neutral position of the brake is concentric with the rotor 2. The drum 8 is provided with an end wall 9 having a centrally disposed opening 12 therein which is of a diameter slightly less than that of the rotor 2 thereby preventing the said rotor from passing through the said opening. The end wall 9 at points defining the outer limits of the opening 12, is provided with an inwardly beveled edge or surface, as at 42. A spiral groove or channel 11 is provided in the outer surface of the end wall 9 for the passage of liquid from the area or chamber surrounding the drum 8 to the central opening 12 from whence it enters the interior of the said drum. The opposite side of the drum 8 is provided with a detachable end wall 10 which is preferably secured to the said drum by suitable threaded and screwable means. The end wall 10 has a central opening 13 of the approximate size of opening 12, and the edge of the opening is also inwardly beveled, as at 43. The beveled edges 42 and 43 facilitate the entry of liquid into the interior of the drum 8 after it has proceeded to the central openings 12 and 13. The spiral groove or channel 11 in the end wall 9 tends to accentuate the delivery of oil or other liquid to the interior of the drum 8 when the latter is depressed into a liquid or oil reservoir located within an outer casing 17. A coupling 27 is provided axially on the side of the casing for securing the latter to a supporting member or device.

The drum 8 is shifted from a neutral position which is concentric with the rotor 2 to an eccentric braking position by means of suitable foot or hand operated apparatus. Positioned above the drum 8 between the latter and the outer casing 17 is a roller 15 which is rotatably mounted on a rod 15a which is secured at its ends to links 15'. The roller 15, the rod 15a and the links 15' are positioned entirely within the casing 17 with the links adjacent but spaced from the front and rear end walls of the said casing. The links 15' are secured rigidly to rotatable pins 25 which extend through the front and rear end walls of the casing.

Secured rigidly to one of the pins 25 is a lever member 16 which is adapted to be depressed by any suitable means when it is desired to apply the brake. By pressing the lever member 16 in a downward direction the roller 15 is actuated so as to shift the drum 8 downwardly into an eccentric position with respect to the rotor 2. In the lower portion of the outer casing 17 is a quantity of oil or other liquid, the normal level of which is indicated by the numeral 18. The quantity of oil or other liquid in the lower side of the casing may vary in accordance with different requirements or conditions, so for this and other reasons the level illustrated on the drawings is merely a conventional disclosure. Positioned in the outer casing 17 at opposite sides of the drum 8 are longitudinally disposed rollers 51 which are axially mounted on the opposite front and rear end walls of the said casing and serve as guide means for assisting the return of the drum to its neutral position after it has been released from a braking position. The outer casing 17 at opposite sides thereof is provided axially with annular oil traps 30 through which the shaft 1 extends. Positioned in the annular oil traps are circular oil rings 33, and oil passages 34 in the casing serve to admit oil from the interior of the casing 17 into the interior of the oil traps 30 for lubrication purposes. The front wall 21 of the casing 17 is provided on its inner face with radial grooves 22 which serve to assist, along with the spiral grooves 11 in the end wall 9 of the drum 8, in conveying oil or other liquid toward the center of the said drum to points where it may enter through the opening 12 in the said side wall.

During the operation of the invention with the various parts in neutral, the oil lying between the drum 8 and the rotor 2 will be freely carried around by the vanes 4. To apply the brake the drum 8 is shifted to an eccentric position thereby contracting or reducing the space portion, designated as A, between the drum and the rotor into a tapered or gradually narrowing section which tapers or narrows in the direction of rotation of the rotor. The oil upon entering the drum 8 through the central end openings 12 and 13 substantially fills the space between the rotor 2 and the cylindrical walls of said drum. As the oil contained in the lower enlarged space (designated by the letter B in Fig. 1) is carried by the rotating vanes 4 upwardly and into the reduced and tapered space, designated by the letter A, and since the said oil is non-compressible, there will be a wedging of the oil between the periphery of the rotor 2 and the inner surface of the cylindrical side wall of the drum 8, thereby effecting a braking or retarding action to the rotor and the shaft 1 to which the latter is secured. The force of the braking action will be proportionate to the movement of the drum 8 from its neutral position, thus the greater the restriction of the space A, the greater the resistance to the flow of the oil therethrough, and the greater thereby is the braking effect upon the rotating members which carry the oil through this restricted space.

Upon releasing the brake actuating mechanism, the drum 8 will move back to a concentric position with the rotor 2, and during such movement the rollers 51 will assist in guiding it into such position. When there is no external braking force applied to the drum 8 to move it from its neutral position, the equalizing pressures of the springs 5 and the centrifugal force applied to the oil as it is carried around by the vanes 4, tend to maintain the said drum in a concentric position with respect to the rotor 2. When in a neutral position the roller 15 as well as the rollers 51 will have a very slight clearance with respect to the outer circumferential surface of the drum 8, thereby offering no resistance to the rotation of the shaft 1.

The outer casing 17 is provided with a plurality of cooling fins 37 which tend to quickly dissipate the heat generated in the device.

Having described my invention, what I claim is:

1. In a hydraulic brake, an outer casing, a cylindrical drum positioned concentrically in the casing having end walls which are provided with axial openings for the passage of fluid into the drum, a rotor positioned in the drum in spaced but normal concentric relation thereto, a plurality of radially disposed blades yieldably carried by the rotor, the said blades engaging with the inside surface of the cylindrical walls of the drum, and means for shifting the drum to an eccentric position with respect to the rotor.

2. In a hydraulic brake, a cylindrical casing having cooling fins extending externally therefrom and end walls provided with axial shaft openings; a cylindrical drum positioned in the casing in spaced relation to but normally concentric thereto, end walls on the drum each having axial openings for the passage of liquid from the area outside the drum to the inside of the latter, a rotor positioned in the drum in spaced but normal concentric relation thereto, the said rotor being normally secured to a rotatable shaft extending axially into the casing, a plurality of blades yieldably carried by the rotor and extending radially from the latter's periphery, with their outer ends engaging with the cylindrical wall of the drum, means for shifting the drum to an eccentric position with respect to the rotor, and roller means at opposite sides of the drum for guiding the latter back to its normal concentric position after it has been released from a shifted position.

3. In a hydraulic brake, a cylindrical casing having end walls, a cylindrical drum positioned in the casing in spaced relation to but normally concentric thereto, end walls on the drum having axial openings, one of said end walls having spiral grooves on its outer side for conveying liquid to the axial opening in the last mentioned end wall, a rotor positioned in the drum in spaced but normal concentric relation thereto, the said rotor being normally secured to a rotatable shaft extending axially into the casing, a plurality of blades yieldably carried by the rotor and extending axially from the latter's periphery, with their outer ends engaging with the cylindrical wall of the drum, and means for shifting the drum to an eccentric position with respect to the rotor.

4. In a hydraulic brake, a cylindrical casing having end walls; a cylindrical drum in the casing, spaced from and normally concentric therewith; a cylindrical rotor in the drum, spaced from but normally concentric therewith, the said drum and rotor defining an annular chamber extending around the rotor; peripheral blades yieldably extending from the periphery of the rotor and engaging with the cylindrical wall of the drum, the said blades dividing the annular chamber extending around the rotor into sections, a shiftable roller mounted in the casing for engaging with the periphery of the drum, and means connected to the roller and extending externally of the casing for shifting the roller so the drum may be also shifted to an eccentric position with respect to the rotor, whereby certain of the chamber sections may be reduced from their normal size and shape.

ROBERT H. BLOCKER.